(12) United States Patent
Kim et al.

(10) Patent No.: US 7,736,046 B2
(45) Date of Patent: Jun. 15, 2010

(54) OPTICAL SHEET AND BACKLIGHT ASSEMBLY HAVING THE SAME

(75) Inventors: Cheul Young Kim, Seoul (KR); Sang Mook Kim, Gyeonggi-do (KR); Jong Wook Huh, Gyeonggi-do (KR); Dong Ryoul Kim, Gyeonggi-do (KR); Ju Won Lee, Gyeonggi-do (KR); Min Soo Kim, Seoul (KR); Hyun Sil Shin, Busan-si (KR); Yong Jae Kim, Choongcheongbuk-do (KR)

(73) Assignee: Miraenanotech Co., Ltd., Anseong (KR)

( * ) Notice: Subject to any disclaimer, the term of this patent is extended or adjusted under 35 U.S.C. 154(b) by 152 days.

(21) Appl. No.: 11/734,611

(22) Filed: Apr. 12, 2007

(65) Prior Publication Data

US 2007/0279940 A1 Dec. 6, 2007

(30) Foreign Application Priority Data

May 8, 2006 (KR) .................... 10-2006-0041250

(51) Int. Cl.
*F21V 7/04* (2006.01)
*G09F 13/04* (2006.01)

(52) U.S. Cl. .................. 362/617; 362/613; 362/619; 362/628

(58) Field of Classification Search ............... 362/607, 362/619, 628, 617, 620, 330, 613
See application file for complete search history.

(56) References Cited

U.S. PATENT DOCUMENTS

| 5,600,455 | A  | * | 2/1997  | Ishikawa et al. | 349/57  |
|-----------|----|---|---------|-----------------|---------|
| 6,700,716 | B2 | * | 3/2004  | Sejkora         | 359/834 |
| 6,752,505 | B2 | * | 6/2004  | Parker et al.   | 362/627 |
| 7,081,933 | B2 | * | 7/2006  | Yu et al.       | 349/62  |
| 7,213,933 | B2 | * | 5/2007  | Chang et al.    | 362/97  |
| 7,344,282 | B2 | * | 3/2008  | Kim et al.      | 362/335 |
| 7,438,459 | B2 | * | 10/2008 | Hwang et al.    | 362/613 |
| 2005/0002204 | A1 | * | 1/2005 | Lin et al.      | 362/551 |
| 2007/0258268 | A1 | * | 11/2007 | Kim et al.     | 362/627 |
| 2008/0088933 | A1 | * | 4/2008 | Lin             | 359/599 |

FOREIGN PATENT DOCUMENTS

| JP | 1994-148408 | 5/1994 |
| WO | WO 02/057816 A1 | 7/2002 |

* cited by examiner

*Primary Examiner*—Stephen F Husar
*Assistant Examiner*—James W Cranson

(57) ABSTRACT

Provided are embodiments of an optical sheet and a backlight assembly having the optical sheet. The optical sheet can include a body, a plurality of protrusions, and a plurality of embossed portions. The body can form a substrate. One surface of the body can be provided in a planar shape, and the other surface of the body can include the plurality of protrusions, where the protrusions have a triangular shaped cross-section. Each of the protrusions can be configured with the plurality of embossed, which may be formed by a microlens pattern.

4 Claims, 10 Drawing Sheets

OPTICAL SHEET AND BACKLIGHT ASSEMBLY HAVING THE SAME

CROSS-REFERENCE TO RELATED APPLICATION

The present application claims priority under 35 U.S.C. §119 to Korean Patent Application No. 10-2006-0041250, filed May 8, 2006, which is hereby incorporated by reference in its entirety.

BACKGROUND

1. Field of the Invention

The present invention relates to an optical sheet and backlight assembly, and more particularly, to optical sheets for optically enhancing brightness characteristics and view angle characteristics.

2. Description of the Related Art

Unlike other display devices, liquid crystal (LC) molecules interposed between a thin film transistor (TFT) substrate and a color filter substrate of an LCD device are not light-emitting materials emitting light in themselves, but light-receiving materials controlling an amount of light coming from the outside to display an image. Accordingly, the LCD device indispensably requires a separate device for illuminating light onto an LC display panel, i.e., a backlight assembly.

A backlight assembly may typically include: a mold frame in which a receiving space is formed; a reflecting sheet installed on a lower surface of the receiving space to reflect light to an LC display panel; a light guide plate installed on an upper surface of the reflecting sheet to guide light; a lamp unit installed between the light guide plate and lateral walls of the receiving space to emit light; optical sheets stacked on an upper surface of the light guide plate to diffuse and condense light; and a top chassis installed on an upper portion of the mold frame to cover a region ranging from a predetermined location at edges of the LC display panel to a lateral side of the mold frame.

The optical sheets typically may include: a diffusion sheet for diffusing light; a prism sheet stacked on an upper surface of the diffusing sheet to condense diffused light and deliver the condensed light to the LC display panel; and a protection sheet for protecting the diffusion sheet and the prism sheet.

FIG. 1 is a sectional view illustrating a construction of a related art LCD device.

Referring to FIG. 1, the related art LCD device 60 includes a backlight assembly 50 for generating light, and a display unit 40 provided on an upper surface of the backlight assembly 50 to receive light from the backlight assembly 50 and display an image.

In detail, the display unit 40 includes the LC display panel 10, and an upper polarizer 30 and a lower polarizer 20 located on an upper surface and a lower surface of the LC display panel 10, respectively. Also, the LC display panel 10 includes a TFT substrate 11 including electrodes, a color filter substrate 12, and an LC layer (not shown) interposed between the TFT substrate 11 and the color filter substrate 12.

The backlight assembly 50 includes a lamp unit 51 for generating light, and a light guide unit for guiding light generated by the lamp unit 51 to an LC display panel 10.

The lamp unit 51 includes a lamp 51a for generating light, and a lamp reflector 51b surrounding the lamp 51a. Light generated by the lamp 51a is incident to a light guide plate 52 of the light guide unit. The lamp reflector 51b reflects light generated by the lamp 51a to the light guide plate 52, thereby increasing an amount of light incident to the light guide plate 52.

The light guide unit includes a reflector 54, the light guide plate 52, and optical sheets 53. The light guide plate 52 is provided on one side of the lamp unit 51 to guide light from the lamp unit 51.

The reflector 54 is provided on a lower surface of the light guide plate 52 to reflect light leaking from the light guide plate 52 back to the light guide plate 52.

In addition, a plurality of optical sheets 53 for enhancing efficiency of light guided by the light guide plate 52 are provided on an upper surface of the light guide plate 52. In detail, the optical sheets include a diffusion sheet 53a, a prism sheet 53b, and a protection sheet 53c sequentially stacked on the upper surface of the light guide plate 52.

The diffusion sheet 53a scatters light incident from the light guide plate 52 to make a brightness distribution of light uniform.

The prism sheet 53b has an upper surface in which a triangular prism is repeatedly formed to condense light diffused by the diffusion sheet 53a in a direction perpendicular to a plane of the LC display panel 10. Accordingly, most of light passing through the prism sheet 53b propagates in a direction perpendicular to the plane of the LC display panel 10 to have a uniform brightness distribution.

The protection sheet 53c provided on an upper surface of the prism sheet 53b protects a surface of the prism sheet 53b.

FIGS. 2 and 3 are a sectional view and a photo of the related art prism sheet of FIG. 1, respectively. FIG. 4 is a photo of the related art diffusion sheet of FIG. 1.

Referring to FIGS. 2 to 4, the related art prism sheet 100 includes a body 110 to which light diffused by the light guide plate and the diffusion sheet is initially provided, and isosceles triangular prism-shaped protrusions 120 for allowing the diffused light to propagate in a predetermined direction. The protrusions 120 are linearly arranged in stripes on the body 110.

The isosceles triangular prism-shaped protrusions 120 have a pitch of 10-100 μm, and have a characteristic in that brightness increases and a view angle becomes narrow as an angle α of a vertical angle (generally, an acute angle) of the triangular prism decreases.

The diffusion sheet as shown in FIG. 4 scatters light incident from the light guide plate 52 to make the brightness distribution of light uniform and provide light having the uniform brightness distribution to the prism sheet 100.

Referring to FIGS. 2 and 3, in the case where the triangular prism-shaped protrusion 120 is formed to face a front side, that is, in the case where the protrusion 120 faces the LC display panel, diffused light introduced via the body 110 is refracted and condensed to the front side, but light incident to an inclined surface of the protrusion cannot contribute to brightness enhancement of the front side due to total internal reflection.

To address this problem, the triangular shape of the prism sheet 100 is formed in an isosceles triangular shape, or the prism sheet 100 is reversely arranged such that the protrusion of the prism sheet 100 faces the light guide plate as an alternative. However, even in these proposed related arts, it can be very difficult to obtain desirable results in both brightness and view angle.

BRIEF SUMMARY

Accordingly, embodiments of the present invention are directed to an optical sheet and a backlight assembly.

Additional features of the invention will be set forth in part in the description which follows and in part will become apparent to those having ordinary skill in the art upon examination of the following or may be learned from practice of the invention. Other advantages of the invention may be realized and attained by the structure particularly pointed out in the written description and claims hereof as well as the appended drawings.

In accordance with the purpose of the invention, as embodied and broadly described herein, there is provided an optical sheet including: a body; a plurality of protrusions arranged on the body; and a plurality of convex portions disposed on the protrusions, where each of the convex portions can have a thickness that increases from edge to center.

In another aspect of the present invention, there is provided an optical sheet including: a body forming a substrate and having one surface in a planar shape; a plurality of protrusions formed in a prism shape and disposed on the other surface of the body; and a plurality of embossed portions formed in a microlens pattern and disposed on the protrusions.

In yet another aspect of the present invention, there is provided an optical sheet including: a body to which light is introduced; protrusions formed on the body and having a predetermined inclined surface; and a plurality of convex portions protruding to a predetermined thickness and/or a plurality of concave portions recessed to a predetermined depth, the convex portions and the concave portions being disposed on the surface of the protrusions, in an embodiment, the concentration efficiency of light can be changed according to the number of the convex portions or concave portions disposed on the surface of the protrusions.

The optical sheets according to embodiments of the present invention may improve brightness and a view angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
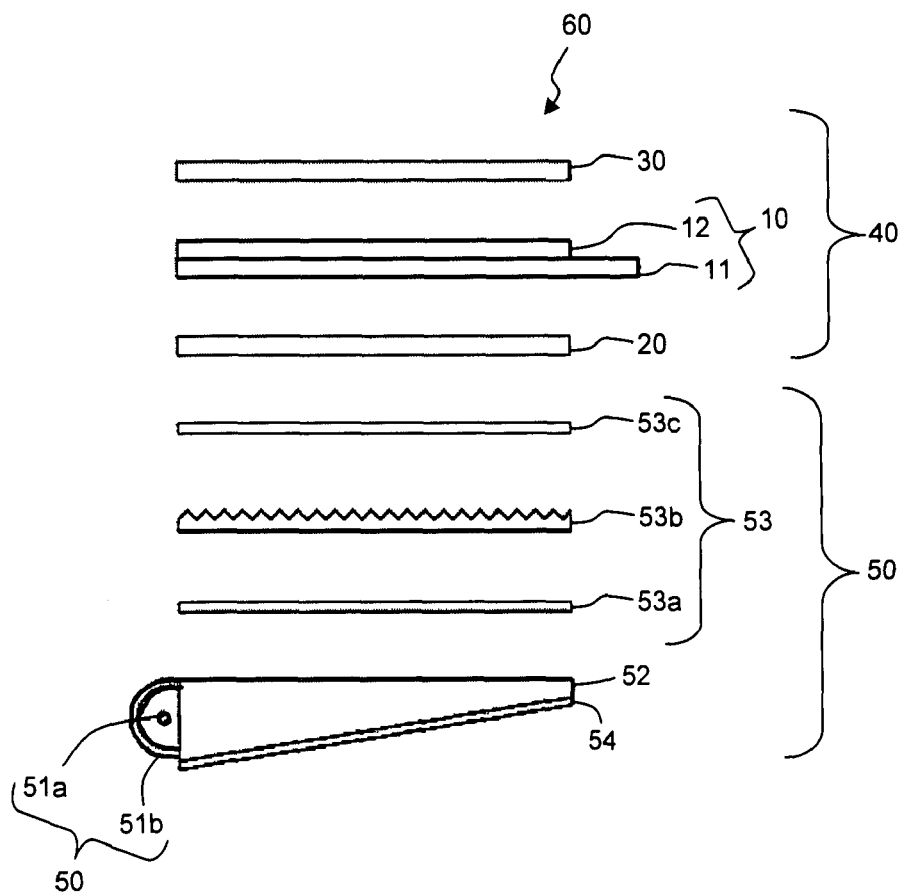
FIG. 1 is a sectional view illustrating a construction of a related art LCD device.
Figure 2:
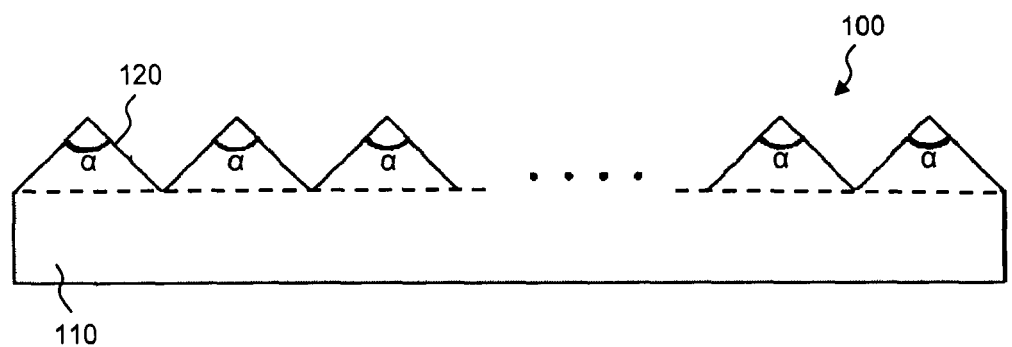
FIG. 2 is a sectional view of the prism sheet according to the related art LCD device illustrated in FIG. 1.
Figure 3:
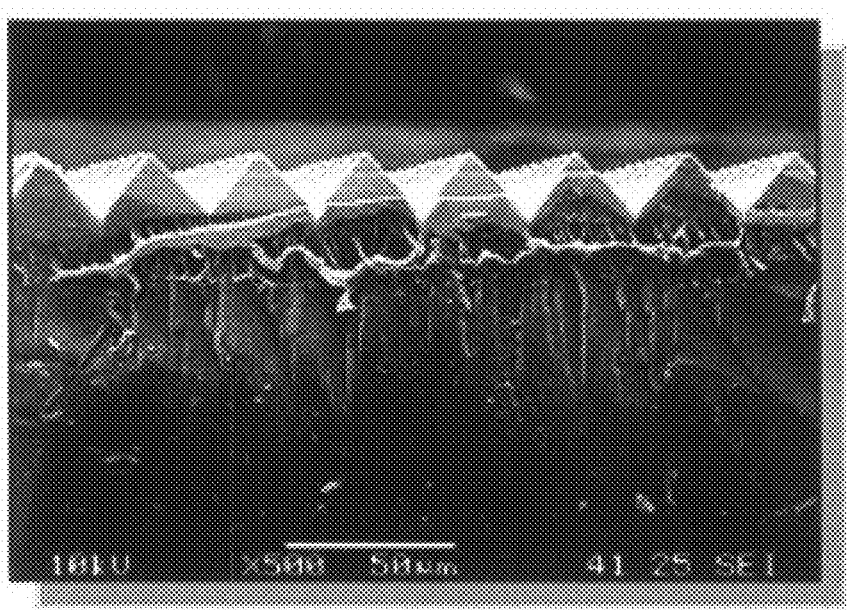
FIG. 3 is a photo of the prism sheet according to the related art LCD device illustrated in FIG. 1.
Figure 4:
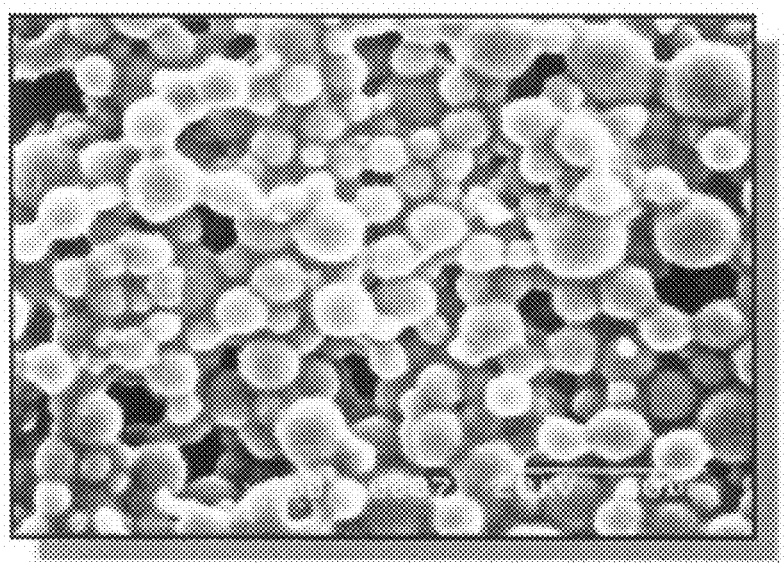
FIG. 4 is a photo of the diffusion sheet according to the related art LCD device illustrated in FIG. 1.
Figure 5:
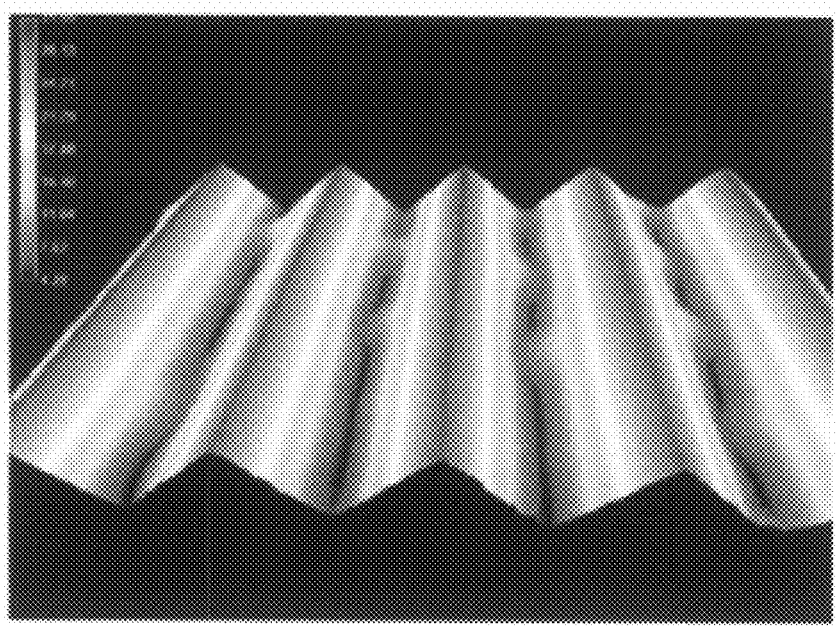
FIGS. 5 and 6 are photos of optical sheets according to embodiments of the present invention.
Figure 6:
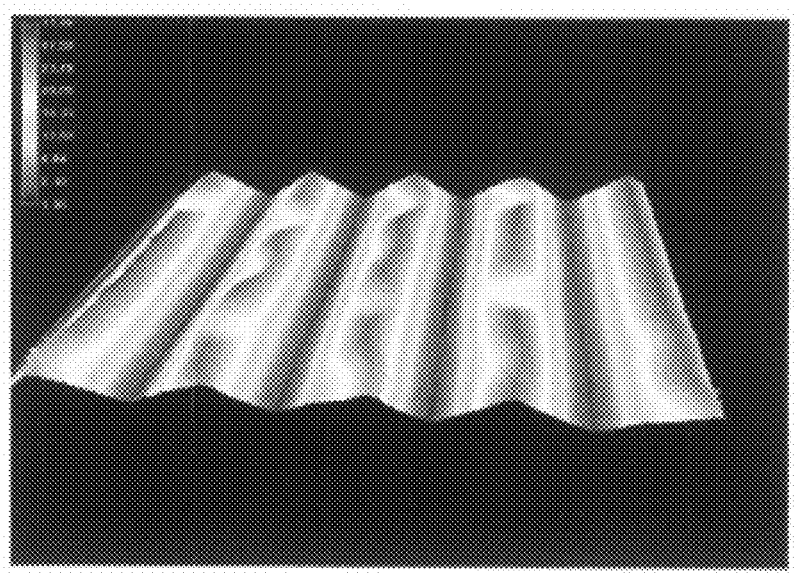
Figure 7:
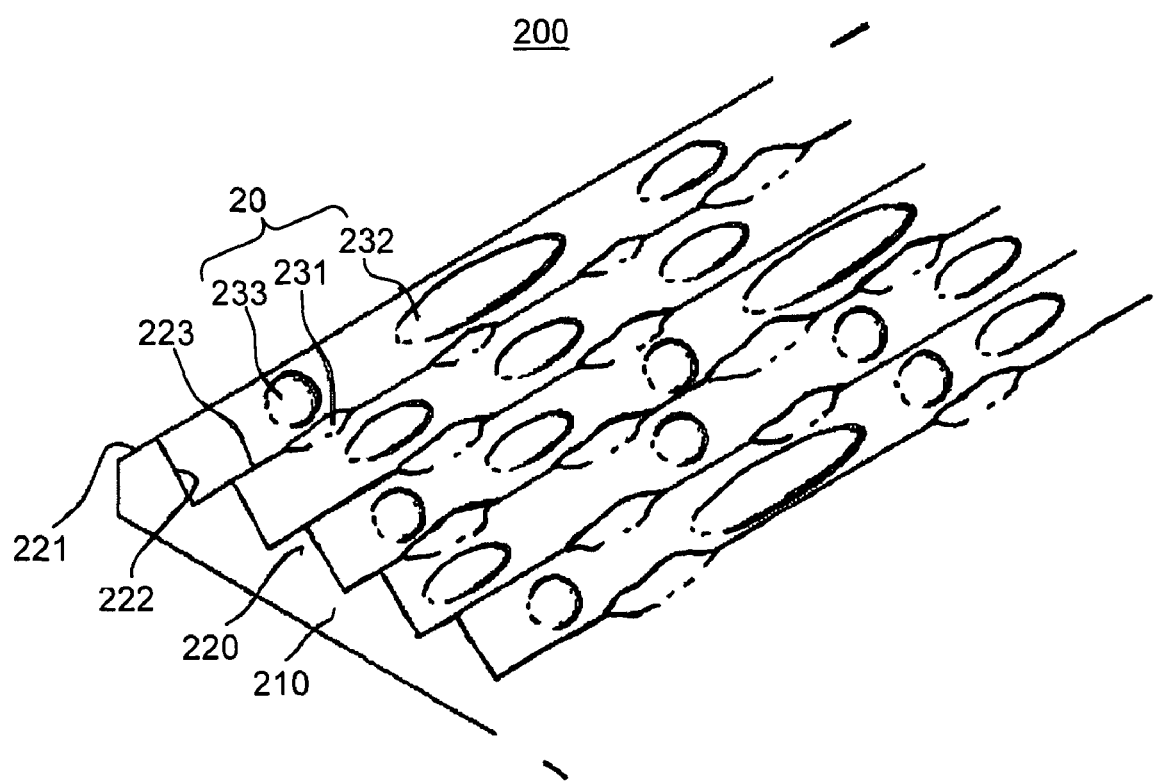
FIG. 7 is a perspective view illustrating an optical sheet according to an embodiment of the present invention.
Figure 8:
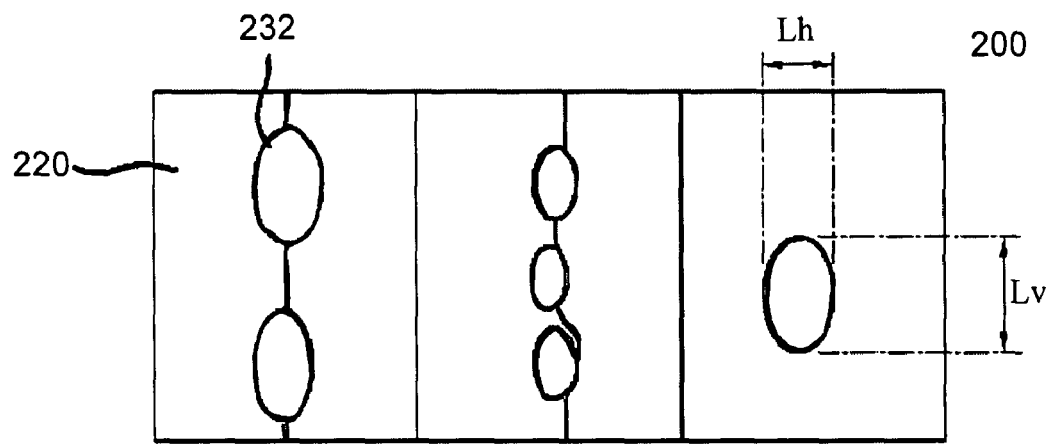
FIG. 8 is a plan view illustrating an optical sheet according to an embodiment of the present invention.
Figure 9A:
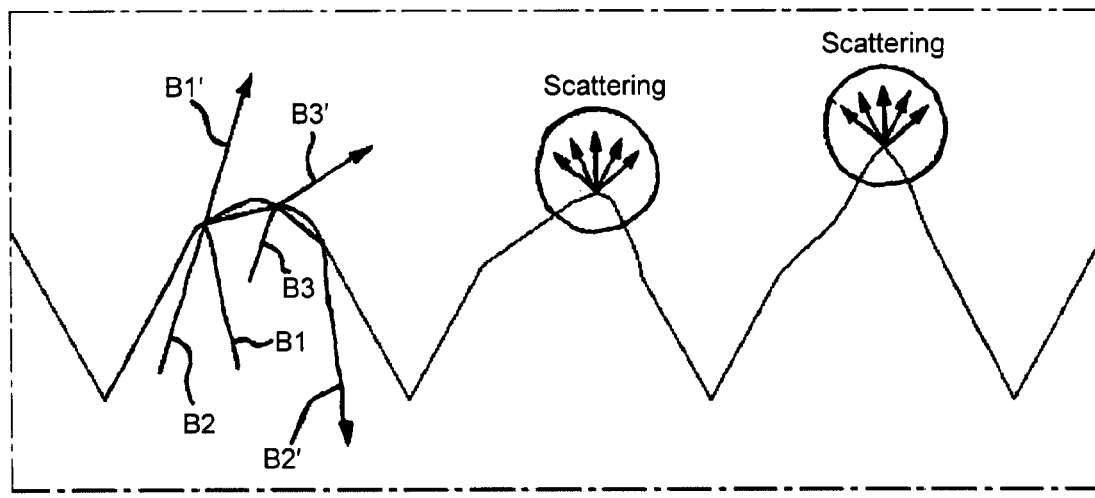
FIGS. 9a and 9b are diagrams showing optical characteristics of an optical sheet according to an embodiment of the present invention.
Figure 9B:
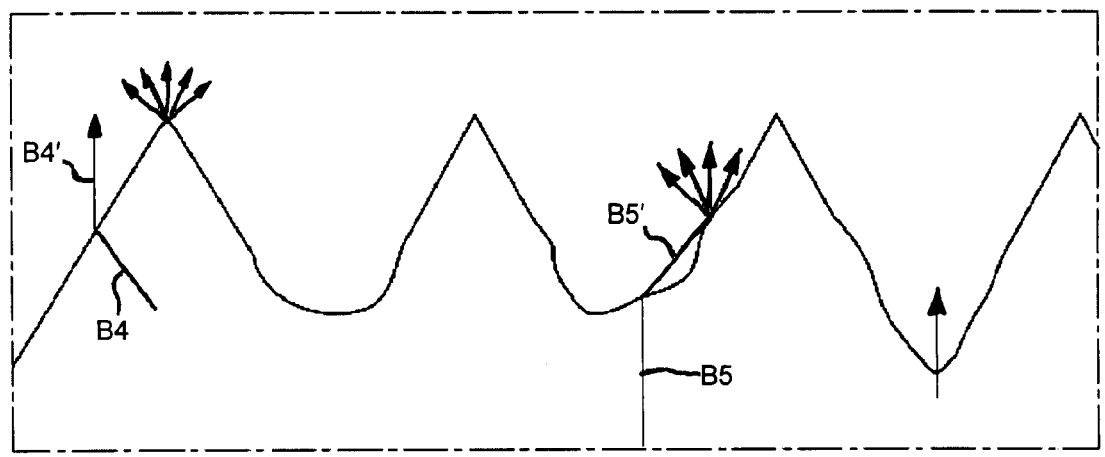

FIGS. 5 and 6 are photos of optical sheets according to embodiments of the present invention, FIG. 7 is a perspective view illustrating an optical sheet according to an embodiment of the present invention, FIG. 8 is a plan view illustrating an optical sheet according to an embodiment of the present invention, and FIGS. 9a and 9b are diagrams showing optical characteristics of an optical sheet according to an embodiment of the present invention.

Referring to FIGS. 5 and 6, cross sections of optical sheets according to an embodiment of the present invention can have triangular shapes similar to that of a related art prism sheet, and embossed portions can be disposed on the triangular prism shapes according to embodiments of the present invention.

The embossed portions may be formed by a plurality of convex portions that protrude from the surfaces of the triangular prism shapes, and/or by a plurality of concave portions that are recessed to a predetermined depth.

The periphery of the convex portion may appear relatively recessed compared to the convex portion. The convex portions may be disposed on the optical sheets according to embodiments of the present invention. An optical sheet according to an embodiment of the present invention includes a body (or a substrate) and a plurality of protrusions having a plurality of convex portions disposed thereon.

The convex portions can be disposed irregularly on an arbitrary area of the plurality of protrusions, but may also be disposed according to a predetermined rule in other embodiments.

That is, the optical sheet according to an embodiment of the present invention may include a body to which light is introduced first, a plurality of protrusions for allowing the light to propagate uniformly, and a plurality of convex portions disposed on an arbitrary area of the surfaces of the protrusions to improve concentration efficiency of the light passing through the protrusions.

Referring to FIGS. 7 and 8, an optical sheet 200 according to an embodiment of the present invention can include a body (or a substrate) 210 to which light is introduced, a plurality of protrusions 220 formed on an upper surface of the body 210 to refract and reflect the light, and a plurality of convex portions 230 formed integrally with the protrusions 220 to improve concentration and diffusion efficiency of light.

The plurality of protrusions 220 can be arranged in a stripe shape on the body 210. A cross section of each protrusion 220 can have a triangular shape as a whole. Parts of the triangular prism-shaped protrusions 220 may be distorted by the convex portions 230.

In detail, one surface of the body 210 can be flat, and the protrusions 220 and the convex portions 230 can be formed on another surface of the body 210.

Also, the body 210 can include plastic film formed of such materials as, but not limited to, polyethylene terephthalate (PEP), polyethylene naphthalate (PEN), oriented polypropylene, polycarbonate, triacetate or the like.

For example, a polyester film such as TETRON™ film or MELINEX™ film may be used as a substrate.

A cross section of each protrusion 220 may have a triangular shape similar to that of a general prism sheet and, although not shown in drawings, may have an isosceles triangular shape or a triangular shape having at least one bend.

The protrusions 220 and the body 210 may be formed integrally with each other by using the same material. Also, the protrusions 220 may be coated with a transparent metal compound or a synthetic resin.

When the cross section of each protrusion 220 has a triangular shape, each protrusion 220 has two surfaces 221, 222 to form the triangular shape as illustrated in FIG. 7. Also, an edge 223 is formed at the point where the two surfaces 221, 222 meet.

However, the cross section of each protrusion 220 may have a distorted triangular shape according to conditions of a manufacturing process, and in this case the two surfaces 221, 222 may be distorted.

That is, the protrusions 220 may have the two surfaces 221, 222 inclined to a predetermined angle with respect to a surface of the body 210, and the edge 223 formed by the two surfaces 221, 222.

Hereinafter, it can be assumed that the protrusions 220 have the two surfaces 221, 222 and the edge 223 when describing the convex portions 230 in detail.

The convex portions 230 may be disposed on the surfaces 221, 222 and the edge 223. When the convex portions 230 are disposed on the edge 223, the edge 223 may be distorted.

The cross section of each protrusion 220 can have a triangular shape, and the convex portions 230 can be irregularly arranged in an arbitrary position on the protrusions 220.

In further detail, a top view shape, as illustrated in FIG. 8, of convex portion 230 may be provided in a circular or elliptical shape, and can have a thickness that increases from its edge to its center. In a specific embodiment, the convex portions 230 can be formed as a plurality of microlens patterns 230 disposed on the protrusions 220.

The convex portion 230 can be formed to have a thickness that increases from its edge to its centers.

In an embodiment, the convex portions 230 may be disposed on the two surfaces 221, 222 and the edge 223.

Referring to FIG. 7, convex portions disposed on the edge 223 of the protrusions 220 are illustrated as first convex portions 231, convex portions disposed on the surfaces 221, 222 of the protrusions 220 are illustrated as second convex portions 232, and the convex portions having circular or elliptical shapes are illustrated as third convex portions 233.

As described above, the convex portions 230 may be provided in various shapes, and the forming positions of the convex portions 230 may be irregularly arranged on the protrusions 220.

The forming position and shape of convex portion 230 can be varied because light passing through the protrusion 220 propagates in various directions, and concentration or diffusion efficiency can be improved although the forming position and shape are varied.

In a further embodiment, the concentration efficiency can be improved when the convex portions 230 are disposed on the edge 223 of the protrusions 220.

In the embodiment described above, the convex portions 230 are disposed on the edge 223, but in another aspect the convex portions 230 are formed in a shape that connects the surfaces 221, 222 to each other. That is, the convex portions 230 can be disposed at positions at which the edge 223 is formed. As a result, the surfaces 221, 222 may be connected by the convex portions 230.

In a still further embodiment, each protrusion 220 can include two or more surfaces 221, 222 inclined to a predetermined angle to the surface of the body 210, and the convex portions 230 can be disposed between the boundaries of the surfaces of each protrusion 220.

In yet another embodiment, each protrusion 220 can be provided in a triangular prism-shape on the body 210, and a surface of each protrusion 220 can include embossed portions. That is, the convex portions 230 and the protrusions 220 can be formed integrally with each other such that a surface of the protrusions 220 includes convex portions or concave portions.

Although a plurality of protruded convex portions 230 having predetermined thicknesses can be disposed on surfaces of the protrusions 220 in various embodiments of the present invention, a plurality of recessed concave portions recessed to a predetermined thicknesses may be disposed on surfaces of the protrusion 220 in some embodiments of the present invention. In embodiments having recessed concave portions, the concave portions may improve diffusion efficiency of light.

The convex portions 230 may be formed by driving convex lenses made of a predetermined material on surfaces of each protrusion 220, and part of each convex lens may be inserted into the protrusions 220 before the protrusions 220 are hardened.

The lenses used for forming the convex portions 230 and the protrusions 220 may be made of the same material. In a specific embodiment, the lenses can be driven on the edge 223 of each protrusion 220.

A desirable shape of the convex portion 230 according to an embodiment of the present invention is described with reference to FIG. 8.

FIG. 8 is a plane view illustrating the protrusions 220 including the convex portions 230 disposed thereon. A desirable horizontal length Lh and vertical length Lv of convex portion 230 are investigated.

TABLE 1

| Sheet (Lh/Lv) | Haze, % (back→front) | Transmissivity, % (TLT, back→front) | Brightness gain |
|---|---|---|---|
| Sheet 1 (30 μm/40 μm) | 89 | 43 | 1.28 |
| Sheet 2 (35 μm/50 μm) | 92 | 59 | 1.25 |
| Sheet 3 (40 μm/60 μm) | 93 | 67 | 1.20 |

Table 1 shows measurement values of Haze, transmissivity and brightness gain according to changes in horizontal length Lh and vertical length Lv of the convex portions 230 in one optical sheet 200.

A sheet, which is used in the experiment for measuring optical characteristic of an optical sheet according to the present invention, has a size for use in a backlight assembly for an LCD device of 17 inches. The size of the optical sheet may be also applied to 26 inches, 32 inches and 40 inches.

Convex portions in sheet 1 have a horizontal length Lh of 30 μm and vertical length Lv of 40 μm. Convex portions in sheet 2 have a horizontal length Lh of 35 μm and vertical length Lv of 50 μm. Convex portions in sheet 3 have a horizontal length Lh of 40 μm and vertical length Lv of 60 μm.

As the size of a convex portion 230 increases, that is, as the horizontal length Lh and the vertical length Lv increase, Haze and transmissivity become improved and brightness gain becomes slightly deteriorated. The brightness gains in Table 1 are relative values in accordance with optical sheets including convex portions according to embodiments of the present invention. Thus, brightness gains of the optical sheets according to the embodiments are not less compared to brightness gains of a related art prism sheet and diffusion sheet.

Also, as the size of a convex portion 230 decreases, Haze and transmissivity become slightly deteriorated and brightness gain becomes improved.

TABLE 2

| Sheet (Lh/Lv) | Horizontal view angle | Vertical view angle |
| --- | --- | --- |
| Sheet 1 (30 μm/40 μm) | 106 | 72 |
| Sheet 2 (35 μm/50 μm) | 107 | 74 |
| Sheet 3 (40 μm/60 μm) | 108 | 78 |

Table 2 shows view angle characteristics in accordance with the size of a convex portion 230 according to embodiments of the present invention.

As the horizontal length Lh and the vertical length Lv of a convex portion 230 increase, horizontal and vertical view angles become increased. The sheet 3, compared with sheet 1, is more suitable for increasing a view angle of an LCD device using an optical sheet according to embodiments of the present invention.

FIG. 9 illustrates optical characteristics of an optical sheet according to an embodiment of the present invention. Incident light, which enters the convex portions 230, is scattered and the scattered light may make up for defects, which may exist in the optical sheet.

When defects exist in the optical sheet, although dark spots of a predetermined size may be observed, the dark spots may be eliminated by scattering the incident light through the convex portions 230.

When an incidence angle of light, which enters a boundary surface between media, is greater than a critical angle to achieve total reflection, total reflection can be achieved. That is, if the incidence angle is greater than the critical angel, internal reflection can be achieved. On the other hand, when the incidence angle of light is smaller than the critical angle, the light may be refracted to pass through the boundary surface.

As illustrated in FIG. 9a, light B2, an incidence angle of which is greater than a critical angle, is internally reflected to become light B2' propagating towards the body 210. Lights B1, B3, each having an incidence angle smaller than the critical angle, are refracted to become lights B1', B3' passing through the surfaces of a protrusion 220.

Referring FIG. 9b, when an incidence angle of light B4 entering on a surface of a protrusion 220 is smaller than a critical angle, the light B4 is refracted to become light B4' passing through the surface.

When a light B5 passing through the surface becomes a light B5' to be projected on a convex portion in a protrusion, the light B5' may be scattered according to the shape of the convex portion.

Although light is internally refracted to propagate towards the body 210, concentration or diffusion efficiency can be improved by the protrusions 220 or the convex portions 230.

Figure 10:
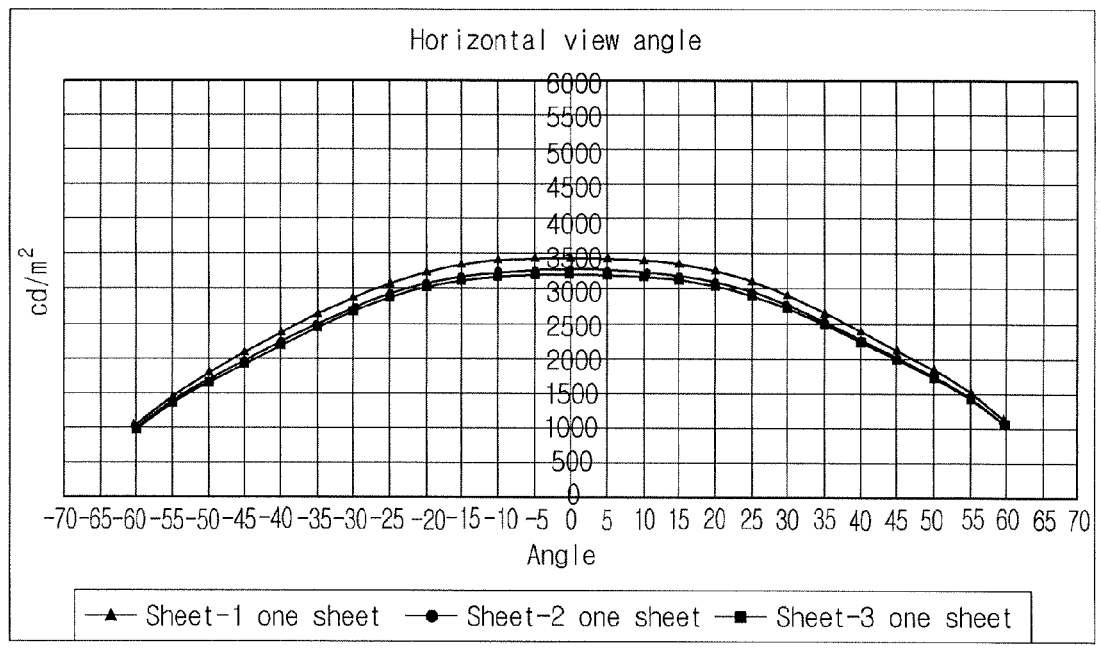
FIGS. 10 and 11 are graphs showing optical characteristics in accordance with the size of a convex portion according to embodiments of the present invention.
Figure 11:
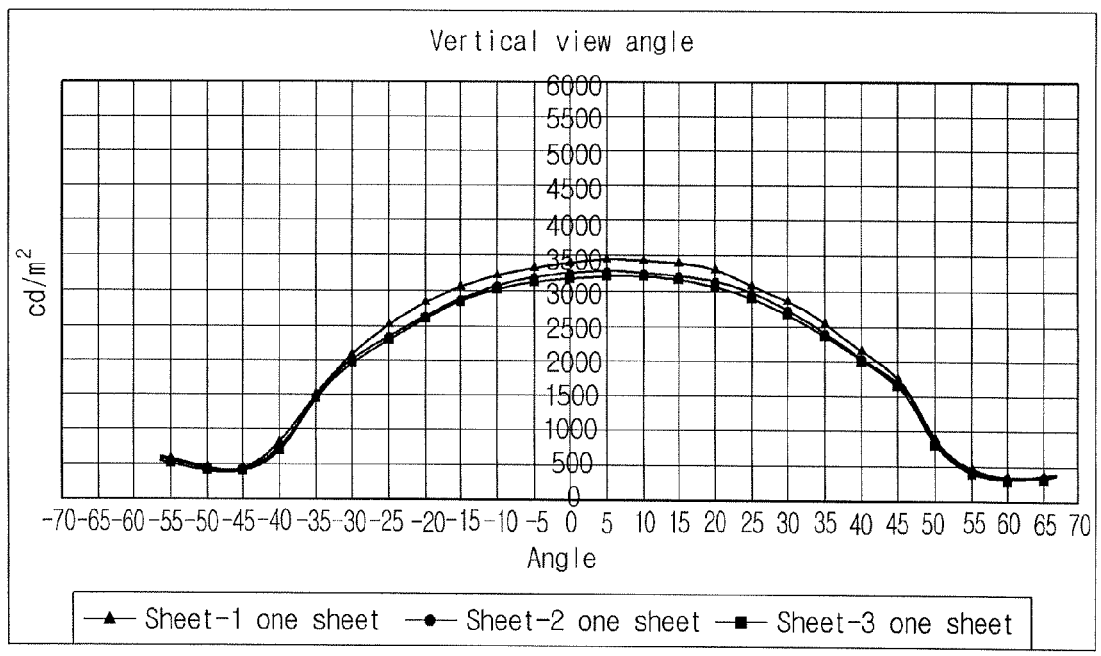

FIGS. 10 and 11 are graphs showing optical characteristics in accordance with a size of a convex portion according to embodiments of the present invention. Also, two optical characteristics described in Table 1 and Table 2 may be compared using FIGS. 10 and 11.

As the size of a convex portion 230 increases, a view angle characteristic becomes better. For example, sheet 3 (having a horizontal length Lh of 40 μm and a vertical length Lv of 60 μm) has better characteristics than sheet 1 and 2 in horizontal and vertical view angles.

Figure 12:
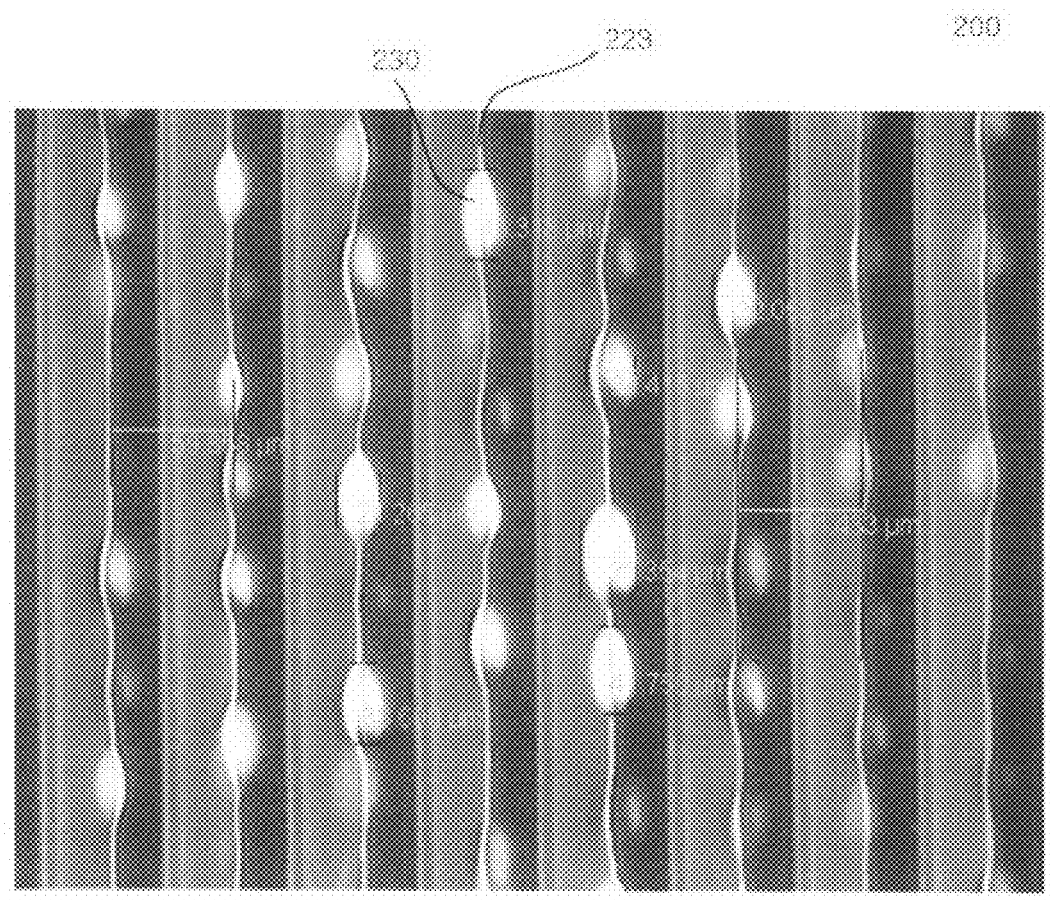
FIGS. 12 and 13 are photos showing optical sheets having convex portions formed in different densities according to embodiments of the present invention.
Figure 13:
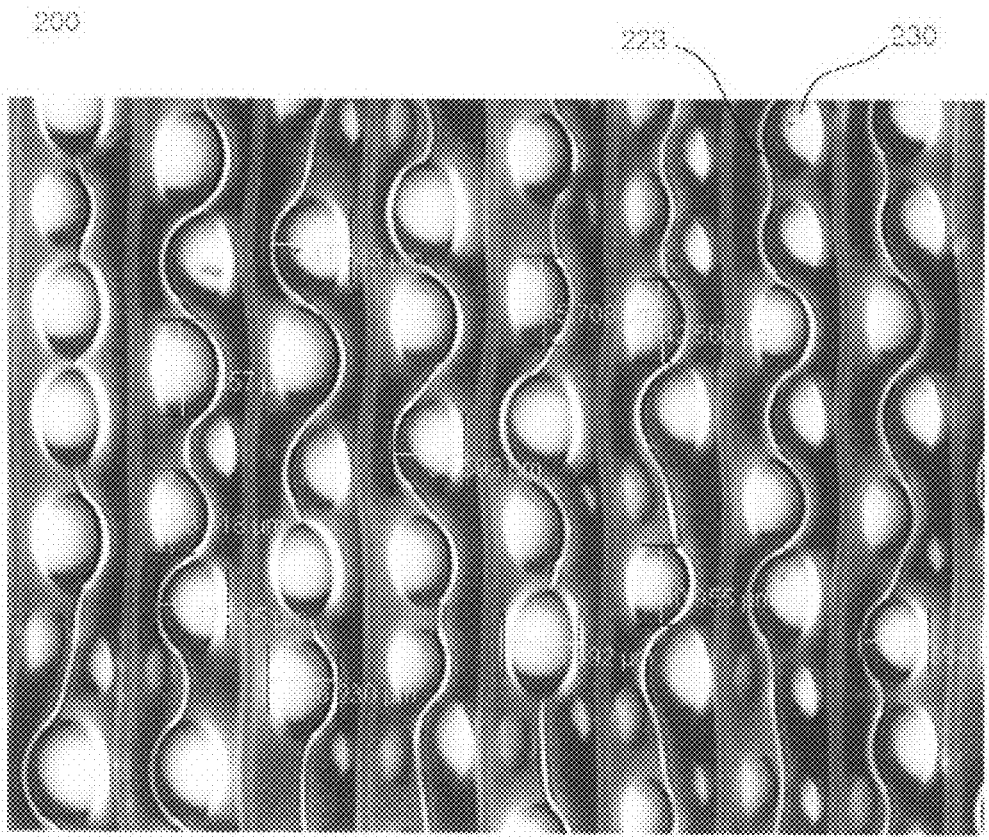

FIGS. 12 and 13 are photos showing optical sheets having convex portions formed having different densities according to embodiments of the present invention.

FIGS. 12 and 13 are plane photos of optical sheets having convex portions disposed thereon. The sheet of FIG. 13 has more convex portions (i.e. a higher density) than the sheet of FIG. 12.

The photos of FIGS. 12 and 13 show that convex portions can be formed in various sizes, which indicates that the shapes of a convex portion and protrusion, the number of convex portions disposed in a predetermined area, and the like may be different according to embodiments of the present invention.

The edges 223 of protrusions appear distorted because the convex portions 230 are disposed on the protrusions of the optical sheet 200.

Although shapes of the protrusions and the convex portions according to embodiments of the present invention are described in detail above, the edges 223 of the protrusions can be distorted because of the convex portions 230 disposed as illustrated in FIGS. 12 and 13.

A backlight assembly for a 17 inch LCD device is used to investigate optical characteristics according to the number of the convex portions 230 on an optical sheet in accordance with embodiments of the present invention. The density of the convex portions 230 is presented as the number of convex portions in a sheet area of 200 μm×200 μm.

The optical characteristics according to the density of the convex portions 230 disposed on the optical sheet 200 will be investigated below.

Optical characteristics of a sheet are measured and investigated, while varying the density of the convex portions in sheet 1 of the previous experiment where a convex portion has a horizontal length Lh of 30 μm and a vertical length Lv of 40 μm.

TABLE 3

| Sheet (ea) | Haze, % (back→front) | Transmissivity, % (TLT, back→front) | Brightness gain |
| --- | --- | --- | --- |
| Sheet 4(5 ea) | 88 | 38 | 1.31 |
| Sheet 5(10 ea) | 89 | 43 | 1.28 |
| Sheet 6(20 ea) | 91 | 58 | 1.25 |

Table 3 shows optical characteristics according to the number (or density) of convex portions disposed on one sheet for an area of 200 µm×200 µm.

Referring to Table 3, as the number of the convex portions 230 increases, Haze and transmissivity become increased and brightness gain becomes decreased.

In detail, if the number of the convex portions 230 is 5 ea, brightness gain has a maximum value of 1.31, and transmissivity has a minimum value of 38. Therefore, the number of the convex portions 230 may be adjusted according to characteristics of a backlight assembly having an optical sheet having the convex portions according to embodiments of the present invention.

TABLE 4

| Sheet | Horizontal view angle | Vertical view angle |
| --- | --- | --- |
| Sheet 4(5 ea) | 101 | 69 |
| Sheet 5(10 ea) | 105 | 72 |
| Sheet 6(20 ea) | 107 | 74 |

Table 4 shows view angle characteristics according to the number of the convex portions.

As the number of the convex portions increases, the horizontal and vertical view angles become larger.

Therefore, an appropriate number of convex portions 230 in the sheet of 200 µm×200 µm may be 10 ea according to results of the experiment. The invention should, however, not be construed as being limited to this exemplary embodiment.

The measured results for the optical characteristics of the optical sheets according to embodiments of the present invention are relative values and are better compared to those of the related art prism sheet or diffusion sheet.

Figure 14:
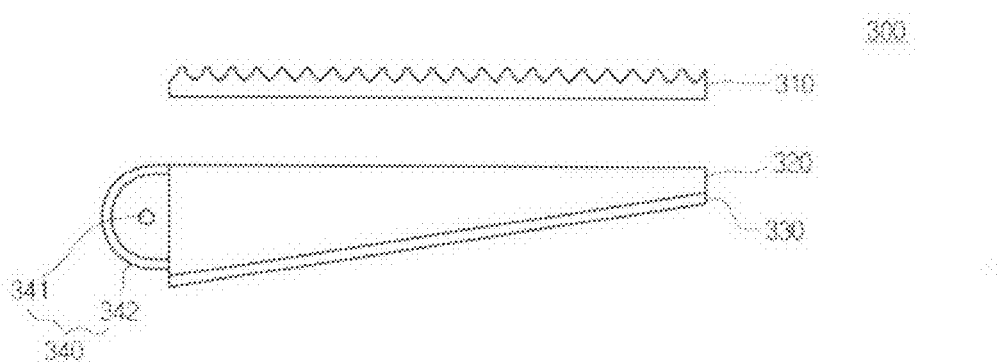
FIG. 14 is a sectional view illustrating the construction of a backlight assembly of an LCD device according to an embodiment of the present invention.

FIG. 14 is a sectional view illustrating a construction of a backlight assembly of an LCD device according to a first embodiment of the present invention.

Referring to FIG. 14, the backlight assembly 300 can include a lamp unit 340 for generating light, and a light guide unit for guiding the generated light to an LC display panel.

The lamp unit 340 includes a lamp 341 for generating light, and a lamp reflector 342 for surrounding the lamp 341. The light generated by the lamp 341 is incident to a light guide plate 320.

The lamp reflector 342 reflects light generated by the lamp 341 to the light guide plate 320, thereby increasing an amount of light incident to the light guide plate 320.

A light guide unit includes a reflector 330, the light guide plate 320, and an optical sheet 310. The light guide plate 320 can be provided on one side of the lamp unit 340 to guide light generated from the lamp unit 340 to an LC display panel.

The reflector 330 can be provided on a lower surface of the light guide plate 320 to reflect light leaking from the light guide plate 320 back to the light guide plate 320.

An optical sheet 310 for enhancing optical characteristics of light guided by the light guide plate 320 can be provided on an upper surface of the light guide plate 320. Although only one optical sheet 310 is illustrated in FIG. 14, a diffusion sheet, a prism sheet or a protection sheet may be further provided.

The optical sheet 310 can sufficiently perform the function of the related art diffusion or prism sheet. With optical sheet 310 according to an embodiment of the present invention being used, the view angle and brightness can be considerably improved.

Figure 15:
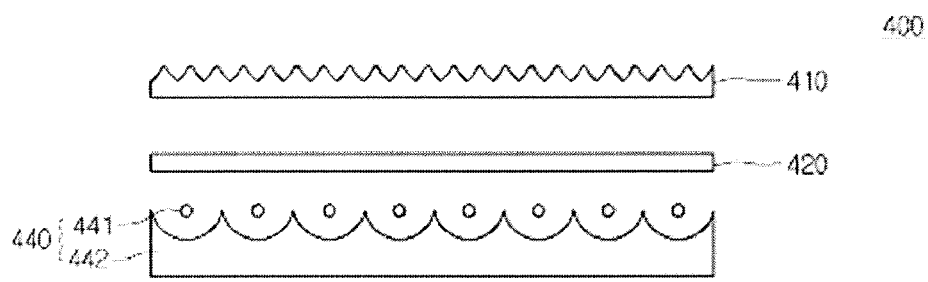
FIG. 15 is a sectional view illustrating the construction of a backlight assembly of an LCD device according to an embodiment of the present invention.

FIG. 15 is a sectional view illustrating the construction of a backlight assembly of an LCD device according to a second embodiment of the present invention.

Referring to FIG. 15, the backlight assembly 400 can include a lamp unit 440 for generating light, and a diffusion unit for guiding light generated by the lamp unit 440 to an LC display panel.

The lamp unit 440 can include a lamp 441 for generating light, and a lamp reflector 442 surrounding the lamp 441. Light generated by the lamp 441 is incident to the diffuser 420.

The lamp reflector 442 reflects light generated by the lamp 441 to the diffuser 420, thereby increasing an amount of light incident to the diffuser 420.

The diffusion unit can include the diffusion plate 420 and an optical sheet 410. The diffuser 420 can be provided on an upper surface of the lamp unit 440 to diffuse light from the lamp unit 440 and can guide the diffused light to the LC display panel.

The diffuser 420 can be provided on an upper surface of the lamp unit 440. The lamp reflector 442 may reflect light leaking from the diffusion plate 420 back to the diffusion plate 420.

The optical sheet 410 can be provided on an upper surface of the diffuser 420 to improve optical characteristics of light guided by the diffuser 420. As described above, the optical sheet 410 can include a body for forming a base portion, protrusions formed in a protruded shape on the body and convex portions disposed on the protrusions.

Figure 16:
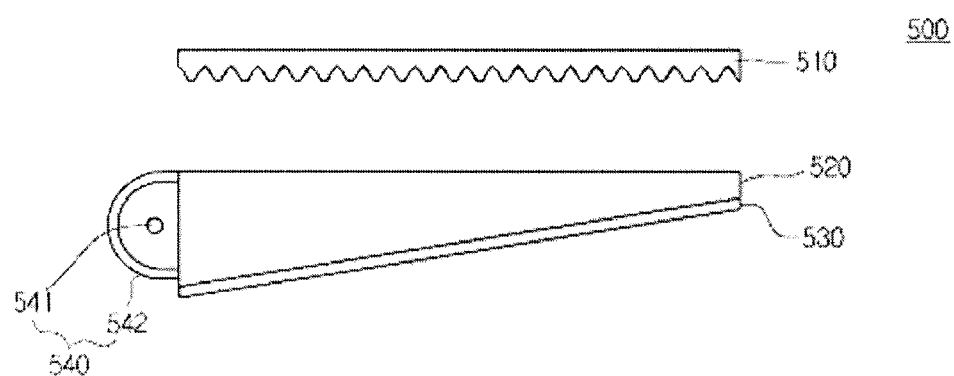
FIG. 16 is a sectional view illustrating the construction of a backlight assembly of an LCD device according to an embodiment of the present invention.

FIG. 16 is a sectional view illustrating the construction of a backlight assembly of an LCD device according to a third embodiment of the present invention.

Referring to FIG. 16, the backlight assembly 500 can include a lamp unit 540 for generating light and a light guide unit for guiding light generated by the lamp unit 540 to an LC display panel. The lamp unit 540 can include a lamp 541 and a lamp reflector 542.

The light guide unit can include a reflector 530, a light guide plate 520 and an optical sheet 510.

In the third embodiment, the optical sheet 510 can be characterized in that protrusions and convex portions thereof are formed to face the light guide plate 520.

Light passing through the light guide plate 520 can be introduced to the protrusions and convex portions, and refracted by the protrusions and convex portions to propagate to the body.

Although FIG. 16 illustrates one optical sheet 510 having the protrusions and convex portions formed to face downward, two or more optical sheets 510 may be stacked, and all or part of the protrusions and convex portions of the optical sheets 510 may be formed to face downward.

Figure 17:
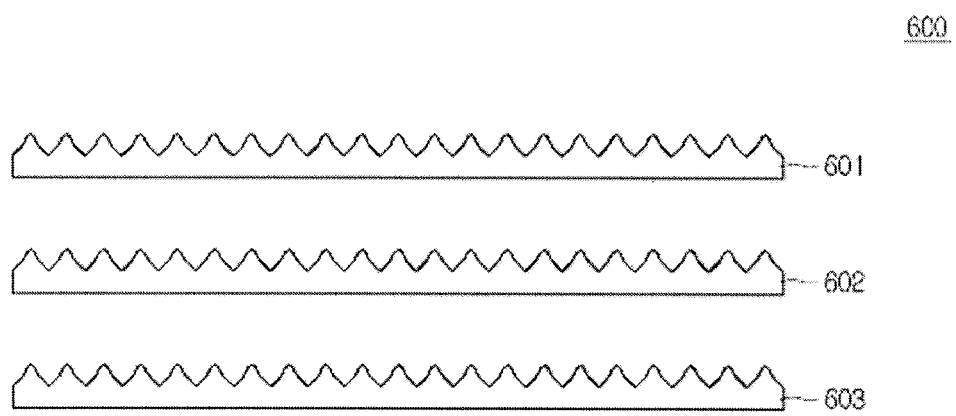
FIG. 17 is a sectional view illustrating a case where two or more stacked optical sheets according to embodiments of the present invention are used.
Figure 18:
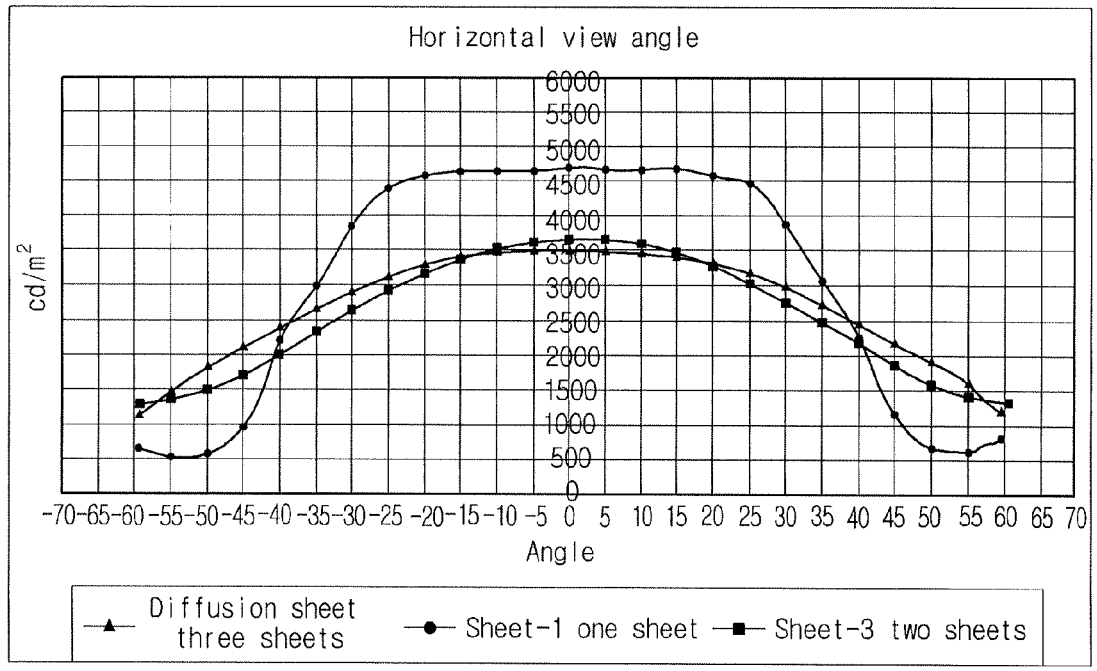
FIGS. 18 and 19 are graphs comparing optical characteristics of a first backlight assembly using one optical sheet according to an embodiment of the present invention, a second backlight assembly using two-stacked optical sheets according to an embodiment of the present invention, and a third backlight assembly using three related art diffusion sheets.
Figure 19:
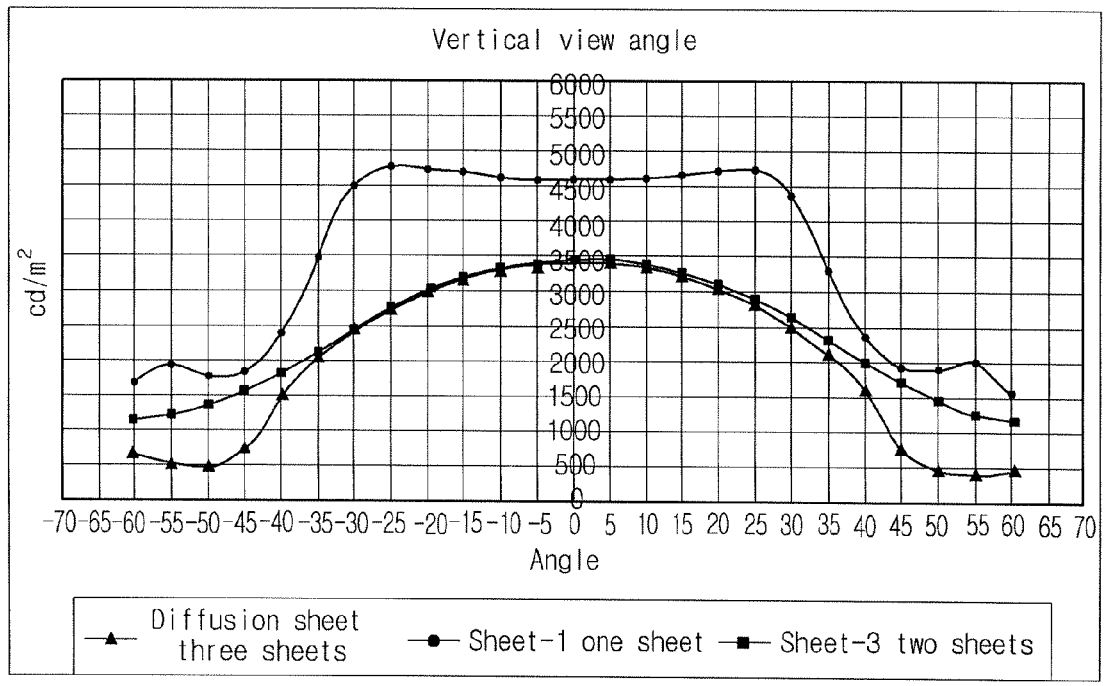

FIG. 17 is a sectional view illustrating the case where two or more stacked optical sheets according to embodiments of the present invention are used. FIGS. 18 and 19 are graphs comparing optical characteristics of a first backlight assembly using one optical sheet according to an embodiment of the present invention, a second backlight assembly using two-stacked optical sheets according to an embodiment of the present invention, and a third backlight assembly using three related art diffusion sheets.

Each of the stacked optical sheets according to embodiments of the present invention used for comparison includes a body to which light is introduced, protrusions that are formed on the body and have a triangular-shaped cross section, and convex portions disposed on an arbitrary area on the protrusions.

A plurality of stacked optical sheets according to embodiments of the invention may be used.

As illustrated in FIG. 17, a backlight assembly 600 according to a fourth embodiment of the invention may use two or more optical sheets. For example, three optical sheets 601, 602, 603, according to embodiments of the invention in a stacked configuration can be used.

Optical characteristics of a first backlight assembly using one optical sheet according to an embodiment of the present invention, a second backlight assembly using two-stacked optical sheets according to an embodiment of the present invention, and a third backlight assembly using three related art diffusion sheets are compared below.

The optical sheets according to an embodiment of the present invention used in the experiment are formed according to the sheet 1 described above in accordance with embodiments of the invention.

In terms of horizontal view angle as illustrated in FIG. 18, brightness is improved to about 1012 cd/m$^2$ at a horizontal view angle of 0° when two stacked optical sheets are used compared with when only one optical sheet is used. Both the single and two stacked optical sheets according to an embodiment of the present invention obtain a greater brightness than when the three related art stacked diffusion sheets are used.

Also, the horizontal view angle becomes wider when only one optical sheet is used than when the stacked sheets are used.

TABLE 5

| Sheet | Brightness gain |
|---|---|
| One optical sheet | 1.28 |
| Two optical sheets | 1.40 |
| Three related art diffusion sheets | 1.28 |

TABLE 6

| Sheet | Horizontal view angle | Vertical view angle |
|---|---|---|
| One optical sheet | 106 | 72 |
| Two optical sheets | 86 | 85 |
| Three related art diffusion sheets | 84 | 83 |

Table 5 shows brightness gains obtained for the three assemblies. Table 6 shows view angles obtained for the three assemblies.

A brightness gain of 1.28 can be obtained when one optical sheet is used and when three stacked diffusion sheets are used. A maximum brightness gain of 1.40 can be obtained when two stacked optical sheets are used.

The brightness gain is greater and the horizontal view angle is smaller when two stacked optical sheets are used than when one optical sheet is used. Therefore, various applications may be possible in accordance with characteristics of a backlight assembly using one or more optical sheets according to embodiments of the present invention.

The brightness gain is greater when the stacked optical sheets according to an embodiment of the present invention are used compared to when three related art diffusion sheets are used.

In brightness gain and view angle, better effects can be obtained when the single optical sheet according to an embodiment of the present invention is used compared to when three related art diffusion sheets are used.

The proposed optical sheet above according to embodiments of the present invention and a backlight assembly having the optical sheet according to embodiments of the present invention may perform similar functions as a related art prism sheet and diffusion sheet. In addition, view angle and brightness gain can be considerably increased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical sheet comprising:
    a body for forming a substrate;
    a plurality of protrusions formed on a surface of the body and arranged in stripes; and
    a plurality of convex portions disposed on the protrusions, wherein light entering the body is condensed, diffused and internally reflected by the protrusions or the convex portions, and the internally reflected light is reflected again by another surface of the body and is condensed and diffused by the protrusions or the convex portions.

2. The optical sheet according to claim 1, wherein the convex portions are irregularly disposed on the protrusions.

3. The optical sheet according to claim 1, wherein the convex portions and protrusions are formed in one body.

4. An optical sheet comprising:
    a body to which light is introduced;
    a plurality of protrusions formed on the body, each having a predetermined inclined surface; and
    a plurality of convex portions protruding to a predetermined thickness and a plurality of concave portions recessed to a predetermined depth disposed on the inclined surfaces of the protrusions,
    wherein concentration efficiency of light is changed according to the number of the convex portions or concave portions, and
    wherein the number of convex portions disposed on the protrusions is in a range from 5 to 20 per 200 um×200 μm area.

* * * * *